3,113,835
METHOD FOR PRODUCING STRONTIUM PHOSPHATE

Michael A. Aia, Towanda, Pa., assignor, by mesne assignments, to Sylvania Electric Products Inc., Wilmington, Del., a corporation of Delaware
No Drawing. Filed July 28, 1958, Ser. No. 751,196
4 Claims. (Cl. 23—109)

This invention relates to new forms of strontium phosphate and to methods of preparation thereof. In particular, it relates to, and to the preparation of, two new forms of strontium hydrogen orthophosphate, denoted by the chemical formula $SrHPO_4$, which is also called dibasic strontium phosphate, secondary strontium phosphate or distrontium phosphate. For convenience I will herein refer to the material as dibasic strontium phosphate.

I have discovered that the compound exists in two separate and distinct crystalline forms, each of which gives specific X-ray diffraction patterns, different from that of the other.

I have discovered that one form, which I have called the alpha form, designated by the Greek letter $\alpha$, is precipitated by reactions in solution at temperature of 40° C. or higher, with the pH of the reacting solutions lying between about 3 and 5 until the equivalence point is approached. This form has small particle size, low specific B.E.T. (Brunauer, Emmett and Teller; Journal American Chemical Socity, vol. 60, page 309, year 1938) surface area, and low bulk density.

I have also discovered that another form, which I have called the beta form, designated by the Greek letter $\beta$, is precipitated at temperatures of 25° C. or below, with the pH of the reaction lying between about 5 and 7 until the equivalence point is approached. This form has larger particle size, much larger B.E.T. surface area and higher bulk density.

Prior to my discovery, the commercially available dibasic strontium phosphate was composed of mixtures of the alpha and beta forms, although that fact was not known, because the existence of two forms had not been discovered. The percentages of the two forms in various commercial material, even "Special Luminescent Grade," varied from manufacturer to manufacturer, and caused variations in the luminescent output of the fluorescent phosphate phosphors made from different batches of starting material.

By using the material of my invention, in which the phosphate is either substantially entirely of the alpha or beta type or of a mixture of known proportions of those types, the resultant phosphor will be reproducible from batch to batch. To produce a phosphor, the dibasic strontium phosphate is generally mixed with activating compounds and the proper proportions of strontium carbonate to form the pyrophosphate, or whatever other phosphate is desired.

PREPARATION OF $\alpha$-$SrHPO_4$

It is possible to utilize the simple reaction between (a) water soluble salts of strontium, such as chlorides, nitrates, acetates and the like, and (b) water soluble monohydrogen phosphate salts such as those of the alkali metals and ammonia, the best reaction occurring with diammonium hydrogen phosphate, $(NH_4)_2HPO_4$, as indicated below:

$$Sr^{+2} + HPO_4^{-2} \rightarrow SrHPO_4 \downarrow$$

The critical processing parameter is the temperature, which should be 40° C. or higher. The pH of the reaction, using $SrCl_2.6H_2O$ and $(NH_4)_2HPO_4$, should be approximately between 3 and 5 until the equivalence point is approached. The concentrations and rate of addition of $(NH_4)_2HPO_4$ are not especially critical in the formation of $\alpha$-$SrHPO_4$, although these must be controlled since they effect ultimate physical properties of the precipitate. Addition of phosphate ion to that of strontium is desirable since the reverse procedure leads to colloidal precipitates which filter with great difficulty.

Calculations for a typical batch, based on a 100 lb. yield of $SrHPO_4$, are as follows:

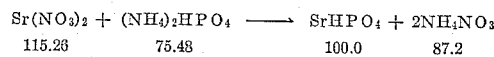

$$Sr(NO_3)_2 + (NH_4)_2HPO_4 \longrightarrow SrHPO_4 + 2NH_4NO_3$$
$$115.26 \qquad 75.48 \qquad \qquad 100.0 \qquad 87.2$$

The figures given represent the pounds of each material. The amount of $(NH_4)_2HPO_4$ includes 5% excess over stoichiometric amount to insure completeness of precipitation. Concentrations up to about 2 molar are satisfactory for reactants. The $(NH_4)_2HPO_4$ solution may be added to the $Sr(NO_3)_2$ solution or the two reactants may be added simultaneously to a third vessel under agitation. Note that 87.2 lbs of $NH_4NO_3$ (in solution) is formed as a by-product of this precipitation. This material is easily removed by decantation. All but adsorbed nitrate ion can be removed by a series of water washes until a negative test is obtained using a suitable qualitative test on the wash water. After filtration, the $\alpha$-$SrHPO_4$ may be dried at temperatures up to about 300° C. Batch yields are quantitative and assays are in the order of 98–100% of theoretical, as shown in the following Table I.

Table I
SOME PROPERTIES OF $\alpha$-$SrHPO_4$ PRECIPITATED AT VARIOUS TEMPERATURES BY THE ADDITION OF 1 M $(NH_4)_2HPO_4$ TO 1 M $SrCl_2.6H_2O$

| Pptn. Temp. (° C.) | Fisher SSS (microns) | Specific Surface Area, B.E.T. (m.²/g.) | Bulk Dens. (g./in.³) | Wt. Percent | | $SrHPO_4$ Assay (percent) |
|---|---|---|---|---|---|---|
| | | | | Sr | P | |
| 40 | 2.4 | 3.8 | 6.1 | 47.4 | 16.2 | 99.0 |
| 60 | 2.2 | 4.2 | 5.4 | 47.4 | 16.2 | 99.3 |
| 80 | 1.9 | 1.3 | 3.6 | 47.6 | 16.3 | 99.5 |
| Calculated for $SrHPO_4$: | | | | 47.7 | 16.9 | |

The effect of temperature on the physical properties considered is readily seen from Table I.

PREPARATION OF $\beta$-$SrHPO_4$

The process for the preparation of $\beta$-$SrHPO_4$ is basically the same as that described for $\alpha$-$SrHPO_4$, with the following differences:

(a) Precipitation temperature should be maintained below a maximum of about 25° C., but above 0° C.

(b) pH of the reaction should lie approximately between 5 and 7 until the equivalence point is approached.

Thus, temperatures approaching 0° C., the freezing point of water may be utilized, although the precipitates formed at this temperature are colloidal in nature and do not settle or filter readily. The effects of temperatures and raw material may be seen from Table II below:

Table II

SOME PROPERTIES OF β—SrHPO₄ PRECIPITATED AT VARIOUS TEMPERATURES BY THE ADDITION OF (NH₄)₂HPO₄ TO STRONTIUM SALTS

| Pptn. Temp. (° C.) | Sr Salt | Fisher SSS (microns) | B.E.T. Surface Area (m.²/g.) | Bulk Dens. (g./in.³) | Wt. Percent | | SrHPO₄ Assay (percent) |
|---|---|---|---|---|---|---|---|
| | | | | | Sr | P | |
| 0 | SrCl₂.6H₂O | 13.0 | 19.6 | 10.2 | 47.3 | 16.3 | 98.5 |
| 17 | Sr(NO₃)₂ | 3.7 | 20.6 | ------ | ---- | ---- | -------- |
| 25 | Sr(NO₂)₂ | 4.0 | ------ | 8.7 | 47.4 | 16.1 | 98.6 |

The higher B.E.T. area of β-SrHPO₄ compared to the α-SrHPO₄ of Table I is evident. Note that the analytical data (percent Sr and percent P) agree with those for α-SrHPO₄.

PREPARATION OF CO-PRECIPITATES OF
α-SrHPO₄ AND β-SrHPO₄

The process for mixed SrHPO₄ powders is again, basically the same as that for α-SrHPO₄. The α- and β-SrHPO₄ structures are enantiotropic in the temperature range about 25-40° C., depending on the pH and the strontium salt used. Precipitation at pH less than 5 and temperatures at the higher end of the 20-50° C. range favor mixtures richer in α-SrHPO₄. Conversely, pH above 5 and lower temperatures favor mixtures richer in β-SrHPO₄. By adjustment of pH and temperature it is possible to obtain all co-precipitated mixtures from 100% α-SrHPO₄ to 100% β-SrHPO₄. Suitable methods of estimating the amount of each form present are:

(a) X-ray diffraction analysis.
(b) Particle size distribution (by sedimentation).

Various modifications will be apparent to those skilled in the art, without departing from the spirit and scope of the invention.

What I claim is:

1. The method of preparing the beta form of dibasic strontium phosphate, said method comprising dissolving in water a water-soluble strontium salt, adding thereto a water-soluble monohydrogen phosphate salt while keeping the resultant solution at a temperature below about 25° C. but above about 0° C., to precipitate out the dibasic strontium phosphate.

2. The method of preparing the beta form of dibasic strontium phosphate, said method comprising dissolving strontium chloride in water and adding thereto ammonium hydrogen phosphate to precipitate out the dibasic strontinum phosphate, the temperature of the solution being kept below about 25° C. but above about 0° C.

3. The method of preparing the beta form of dibasic strontium phosphate, said method comprising dissolving in water a water-soluble strontium salt, adding thereto a water-soluble monohydrogen phosphate salt while keeping the resultant solution at a temperature below about 25° C. but above about 0° C. and at a pH of between about 5 to about 7 until the equivalence point is approached, to precipitate out the dibasic strontium phosphate.

4. The method of preparing the beta form of dibasic strontium phosphate, said method comprising dissolving strontium chloride in water and adding thereto ammonium hydrogen phosphate to precipitate out the dibasic strontium phosphate, the pH of the resultant solution being kept between about 5 to about 7 until the equivalence point is approached, the temperature of the solution being kept below about 25° C. but above about 0° C.

References Cited in the file of this patent
UNITED STATES PATENTS 2,366,270    Lemmers _____ Jan. 2, 1945
2,447,210    Roberts _____ Aug. 17, 1948

OTHER REFERENCES

Lexicon Hoffman, Band 1, 1. Halfte, Wasserstoff Bis Silber, No. 1–31, 1917, page 419.

Gmelin-Kraut: Handbuch der Anorganisch Chemie, 2–2, 1909, page 170.